US012754803B2

(12) United States Patent
Wu et al.

(10) Patent No.: US 12,754,803 B2
(45) Date of Patent: Oct. 6, 2026

(54) CORRECTABLE ERROR TRACKING AND LINK RECOVERY

(71) Applicant: Intel Corporation, Santa Clara, CA (US)

(72) Inventors: Hao Wu, Shanghai (CN); Tao Xu, Shanghai (CN); Changpeng Guo, KunShan (CN); Hehe Li, Shanghai (CN); Fengyi Zhang, Shanghai (CN); Yanxin Zhao, Shanghai (CN); Wenlong Zheng, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/969,321

(22) Filed: Oct. 19, 2022

(65) Prior Publication Data

US 2023/0281080 A1 Sep. 7, 2023

(30) Foreign Application Priority Data

Sep. 30, 2022 (WO) ................ PCT/CN2022/123627

(51) Int. Cl.
*G06F 11/14* (2026.01)
*G06F 11/07* (2006.01)

(52) U.S. Cl.
CPC ...... *G06F 11/1423* (2013.01); *G06F 11/0745* (2013.01); *G06F 11/076* (2013.01); *G06F 11/0793* (2013.01)

(58) Field of Classification Search
CPC ............... G06F 11/0745; G06F 11/076; G06F 11/0772; G06F 11/0784; G06F 11/0793; G06F 11/1423; G06F 11/221; G06F 11/2221; G06F 11/3027; G06F 11/3041
See application file for complete search history.

(56) References Cited

U.S. PATENT DOCUMENTS

| | | | | |
|---|---|---|---|---|
| 10,599,504 | B1 * | 3/2020 | BeSerra | G06F 11/3055 |
| 2004/0156446 | A1 * | 8/2004 | Santhoff | H04H 20/78 375/295 |
| 2008/0256400 | A1 * | 10/2008 | Yang | G06F 11/0781 714/57 |
| 2014/0189427 | A1 * | 7/2014 | Jayaprakash Bharadwaj | G06F 11/1415 714/15 |
| 2021/0050941 | A1 * | 2/2021 | Das Sharma | H04L 1/203 |
| 2021/0349777 | A1 * | 11/2021 | Liu | G06F 11/0745 |
| 2024/0103961 | A1 * | 3/2024 | Wang | G06F 11/0793 |

FOREIGN PATENT DOCUMENTS

| | | | | |
|---|---|---|---|---|
| CN | 106201753 A | * | 12/2016 | G06F 11/0751 |
| CN | 111414268 A | * | 7/2020 | G06F 11/221 |
| CN | 112256539 A | * | 1/2021 | G06F 11/3476 |
| GB | 2456618 A | * | 7/2009 | G06F 11/0721 |

OTHER PUBLICATIONS

Das Sharma, Debendra, “Fast Tracking the Evolution of PCI Express® Technology,” Flash Memory Summit 2017; Santa Clara, CA; 23 pages.

* cited by examiner

*Primary Examiner* — Gabriel Chu
(74) *Attorney, Agent, or Firm* — Alliance IP, LLC

(57) ABSTRACT

An apparatus comprising a first processor comprising first circuitry to track correctable errors detected by a first communication device of a second processor; and second circuitry to communicate with the second processor to initiate, based on the tracked correctable errors, a link recovery procedure for the first communication device.

22 Claims, 9 Drawing Sheets

CORRECTABLE ERROR TRACKING AND LINK RECOVERY

CROSS-REFERENCE TO RELATED APPLICATION

This application claims the benefit of International Application No. PCT/CN2022/123627, filed Sep. 30, 2022.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc. As the processing power grows along with the number of devices in a computing system, the communication between sockets and other devices becomes more critical. Accordingly, interconnects, have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures. Interconnect architectures may be based on a variety of technologies, including Peripheral Component Interconnect Express (PCIe), Universal Serial Bus, and others.

DETAILED DESCRIPTION

Figure 1:
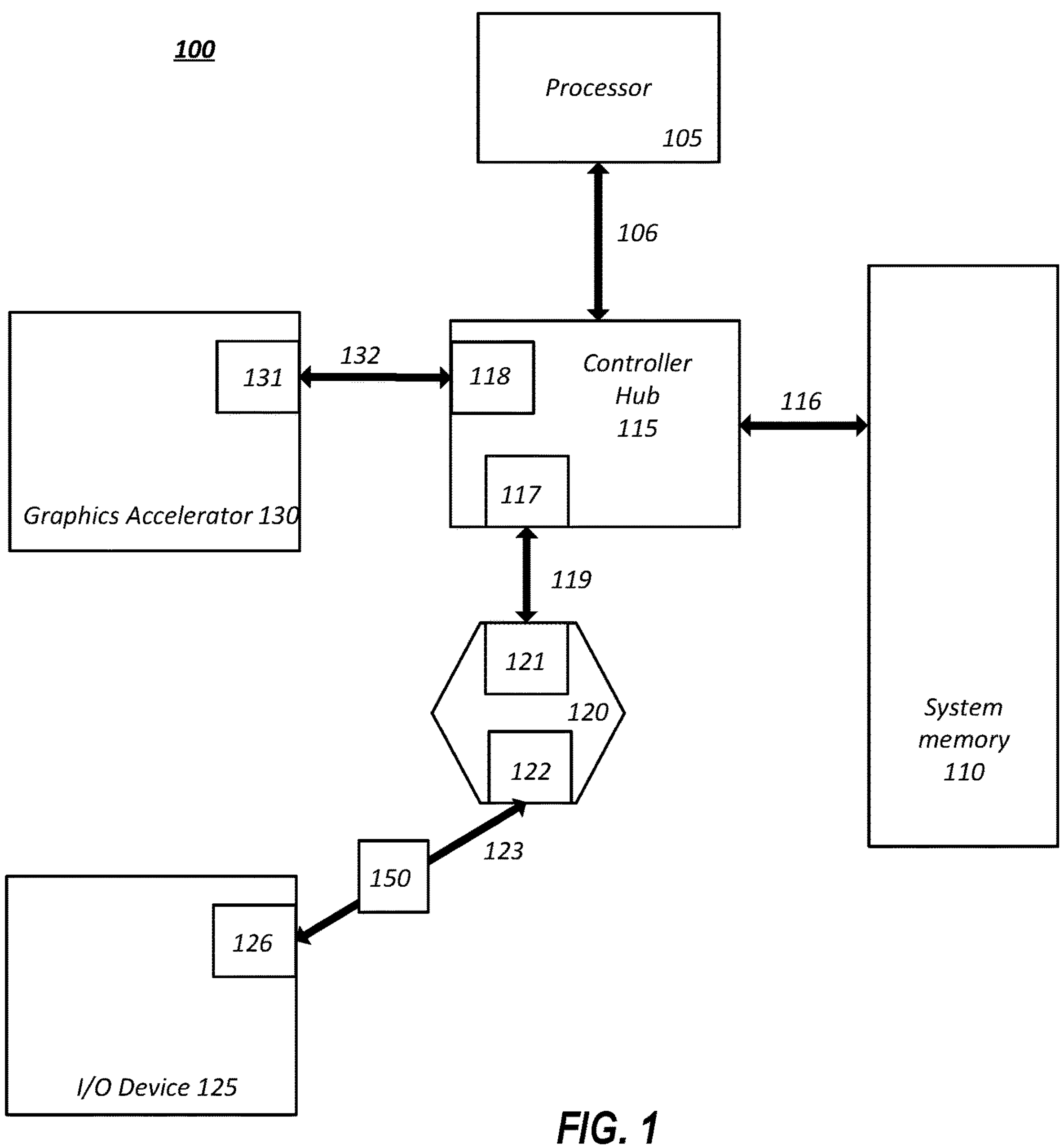
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to specific integrated circuits, such as in computing platforms or microprocessors, other embodiments are applicable to other types of integrated circuits and logic devices. For example, the disclosed embodiments are not limited to desktop computer systems, but may also be used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations.

Some processors (e.g., server processors) may implement a unified and hierarchical error handler system referred to as an "Integrated Error Handler" (IEH) system which may be used to collect errors from an integrated I/O device. In some embodiments, an IEH system may align with an interconnect specification (e.g., a PCI Express (PCIe) specification, such as PCI Express® Base Specification Revision 6.0, published Dec. 16, 2021) and may provide an error reporting mechanism for various integrated I/O devices including Compute Express Link (CXL) devices (e.g., devices that communicate in accordance with a CXL protocol such as CXL Specification, Revision 3.0, Version 1.0 published Aug. 1, 2022) and PCIe devices.

An IEH system may comprise a plurality of satellite IEHs (where a satellite IEH is coupled to one or more root ports) and a global IEH which is coupled to the satellite IEHs. Errors from root ports and I/O devices behind (e.g., downstream of) the root ports may be signaled through the satellite IEHs to the global IEH, which may function as a central resource for logging and error escalation. An IEH system allows flexible options for signaling occurrence of an error. In one embodiment, an assertion of an error pin may signal the occurrence of an error. A system management component (e.g., a Baseboard Management Controller (BMC)) that comprises an out-of-band processor can utilize the error pin assertion (or other notification implementation) to detect errors occurring at a specific root port or at a specific I/O device (e.g., CXL/PCIe device).

Downstream Port Containment (DPC) is a feature defined in the PCIe specification that may be supported by CXL and PCIe Downstream Ports (e.g., ports that point away from a root complex). DPC halts PCIe traffic (e.g., transaction layer packets) below (e.g., downstream of) a root port after an uncorrectable error is detected at the root port or below the root port (e.g., at an I/O device coupled to the root port), avoiding the potential spread of data corruption and supporting further device recovery. DPC also supports usage models in which software or firmware may examine the status of the CXL/PCIe devices and trigger DPC when appropriate. Various embodiments of the present disclosure leverage this usage model to provide proactive recovery of a link for an unstable communication device (e.g., a root port or an I/O device).

In some systems, a basic input/output system (BIOS) may report an error log to an operating system after a number of correctable errors (CEs) detected for a communication device (e.g., root port or I/O device coupled to the root port, such as a CXL/PCIe device) reaches a threshold. When the CE number threshold is reached, it usually indicates that the communication device is unstable, and it is likely that uncorrectable error (UCE) will occur soon. In many situations, a UCE may cause the system to crash or produce other undesirable results.

Various embodiments of the present disclosure provide proactive recovery of a link for an unstable communication device by tracking the number and/or rate of CEs for various communication devices and initiating link recovery based thereon (e.g., when a threshold for the number and/or a threshold for the rate has been exceeded). In various embodiments, the tracking may be performed by an out-of-band processor (e.g., of a BMC), so as to reduce the logic and/or processing load on the processor comprising the I/O device and/or communicating with the I/O device. Thus, the monitoring, status recording, and error rate calculation of the I/O devices may be performed on an OOB processor, avoiding a negative performance impact, e.g., on a server/cloud system comprising the processor (though in other embodiments, such operations may instead be performed by the processor itself, without relying on an OOB processor). In some embodiments, an out-of-band processor (e.g., of a BMC) monitors root ports (e.g., CXL/PCIe root ports) and/or other communication devices (e.g., switches, endpoints) attached to the root ports. The monitoring may include tracking the number and rates of CE per root port and/or per device attached to one of the root ports. Based on the monitoring, the out-of-band processor may utilize a software-triggered DPC flow to initiate recovery of a link of an unstable I/O device. Particular embodiments may take proactive action when, e.g., a threshold corresponding to a number of CEs has not yet been met, but the rate at which CE errors are occurring indicate that the device is unstable and a UCE is likely to occur.

Various embodiments may provide technical advantages, such as one or more of recovery of a link of an unstable device prior to occurrence of an uncorrectable error, improved server and cloud system reliability, improved serviceability, and reduced crash rate.

FIGS. 1-4 below describe example characteristics of systems utilizing PCIe, CXL, or other suitable interconnect protocols that may be used in various embodiments, FIGS. 5-8 describe proactive link recovery in more detail, and FIGS. 9-10 describe example systems in which various embodiments of the present disclosure may be utilized.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. However, an aim of most fabrics is to provide an attractive performance vs. power balance. Below, a number of interconnects are discussed, which would potentially benefit from aspects of the solutions described herein.

One interconnect fabric architecture includes the Peripheral Component Interconnect (PCI) Express (PCIe) architecture. A goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of current and future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through a link 106 such as front-side bus (FSB). In one embodiment, link 106 is a serial point-to-point interconnect as described below. In other embodiments, link 106 includes a serial, differential interconnect architecture that is compliant with one or more different interconnect standards.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 105, while controller hub 115 is to communicate with I/O devices, in a similar manner as described below. In some embodiments, peer-to-peer routing is optionally supported through controller hub 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, e.g., up a hierarchy towards a root complex, to controller hub 115 and downstream, e.g., down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 (also referred to as interfaces) are also to implement a layered protocol stack to communicate between graphics accelerator 130 and controller hub 115. Similar to the MCH discussion above, a graphics controller or the graphics accelerator 130 itself may be integrated in processor 105. It should be appreciated that one or more of the components (e.g., 105, 110, 115, 120, 125, 130) illustrated in FIG. 1 can be enhanced to execute, store, and/or embody logic to implement one or more of the features described herein.

Figure 2:
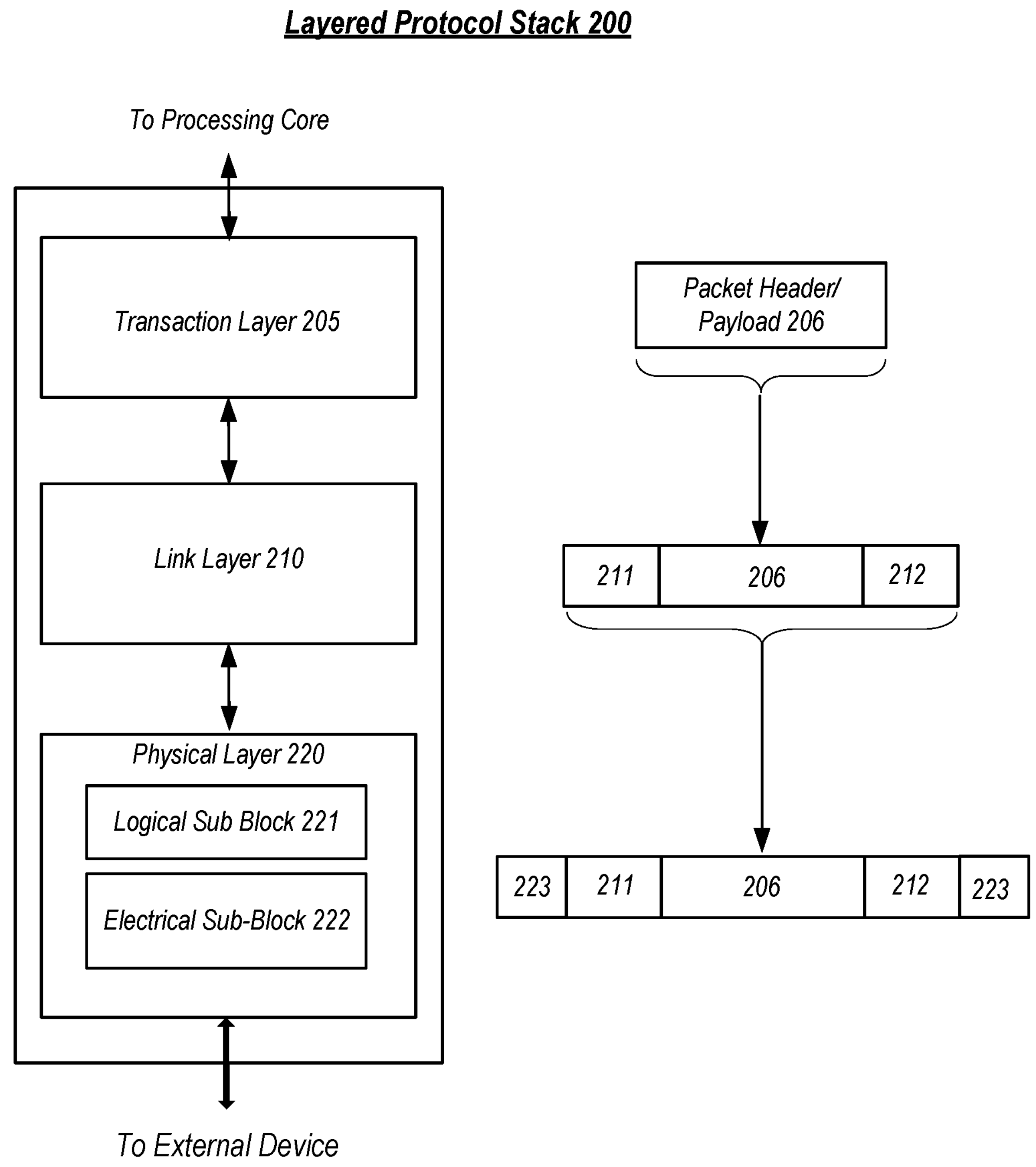
FIG. 2 illustrates an embodiment of an interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the transaction layer 205 and data link layer 210 to carry the information from the transmitting component to the receiving component. As the transmitted packets flow through the other layers, they are extended with additional information necessary to handle packets at those layers. At the receiving side the reverse process occurs and packets get transformed from their physical layer 220 representation to the data link layer 210 representation and finally (for transaction layer packets) to the form that can be processed by the transaction layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (e.g., transaction layer packets, or TLPs). The transaction layer 205 typically manages credit-based flow control for TLPs. PCIe implements split transactions, e.g., transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message transactions are defined to support in-band communication between PCIe agents.

Therefore, in one embodiment, transaction layer 205 assembles packet header/payload 156. Format for current packet headers/payloads may be found in the PCIe specification at the PCIe specification website.

Figure 3:
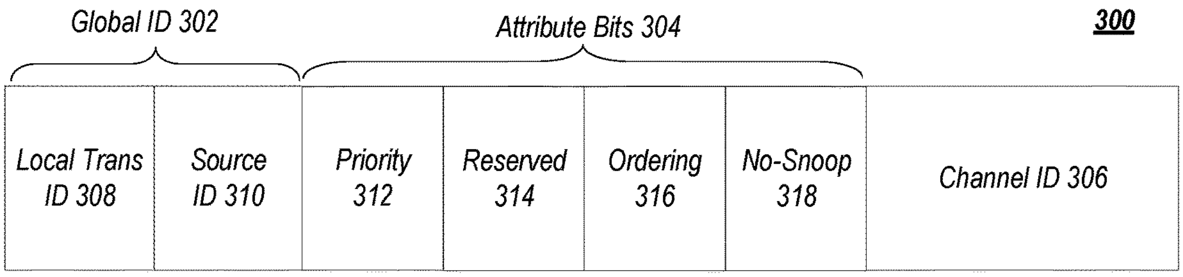
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global identifier field 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions.

In one embodiment, attributes field 304 includes priority field 312, reserved field 314, ordering field 316, and no-snoop field 318. Here, priority field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. No-snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging transaction layer packets (TLPs) between two components a link. One side of the data link layer 210 accepts TLPs assembled by the transaction layer 205, applies packet sequence identifier 211, e.g., an identification number or packet number, calculates and applies an error detection code, e.g., CRC 212, and submits the modified TLPs to the physical layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of physical Layer 220. In this regard, the logical sub-block includes a transmit section to prepare outgoing information for transmission by electrical sub-block 222, and a receiver section to identify and prepare received information before passing it to the Link Layer 210.

Physical layer 220 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8*b*/10*b* transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, e.g., a transaction layer; a second layer to sequence packets, e.g., a link layer; and a third layer to transmit the packets, e.g., a physical layer. As a specific example, a common standard interface (CSI) layered protocol is utilized.

Figure 4:
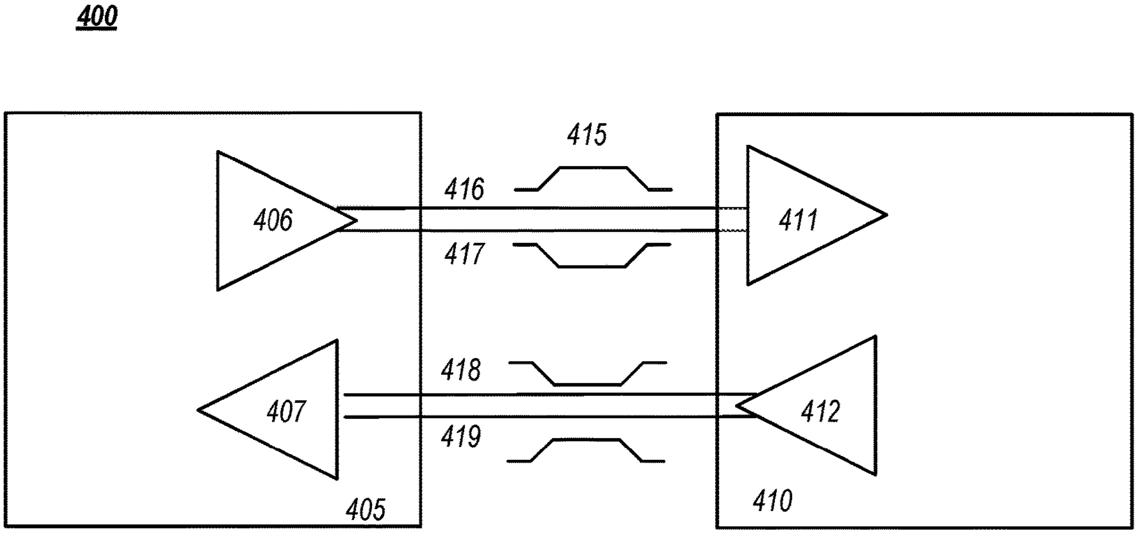
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/412 and a receive pair 411/407. Accordingly, device 405 includes transmission logic 406 to transmit data to device 410 and receiving logic 407 to receive data from device 410. In other words, two transmitting paths, e.g., paths 416 and 417, and two receiving paths, e.g., paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider. In some implementations, each symmetric lane contains one transmit differential pair and one receive differential pair. Asymmetric lanes can contain unequal ratios of transmit and receive pairs. Some technologies can utilize symmetric lanes (e.g., PCIe), while others (e.g., Displayport) may not and may even including only transmit or only receive pairs, among other examples.

A differential pair refers to two transmission paths, such as lines 416 and 417, to transmit differential signals. As an example, when line 416 toggles from a low voltage level to a high voltage level, e.g., a rising edge, line 417 drives from a high logic level to a low logic level, e.g., a falling edge. Differential signals potentially demonstrate better electrical characteristics, such as better signal integrity, e.g., cross-coupling, voltage overshoot/undershoot, ringing, etc. This allows for better timing window, which enables faster transmission frequencies.

A variety of interconnect architectures and protocols may utilize the concepts discussed herein. With advancements in computing systems and performance requirements, improvements to interconnect fabric and link implementations continue to be developed, including interconnects based on or utilizing elements of PCIe or other legacy interconnect platforms. In one example, CXL has been developed, providing an improved, high-speed central processing unit (CPU)-to-device and CPU-to-memory interconnect designed to accelerate next-generation data center performance, among other application. In some instances, CXL may maintain memory coherency between the CPU memory space and memory on attached devices, which allows resource sharing for higher performance, reduced software stack complexity, and lower overall system cost, among other example advantages. CXL enables communication between devices such as host processors (e.g., CPUs) and a set of workload accelerators (e.g., graphics processing units (GPUs), field programmable gate array (FPGA) devices, tensor and vector processor units, machine learning accelerators, purpose-built accelerator solutions, or other devices among other examples). Indeed, CXL is designed to provide a standard interface for high-speed communications, as accelerators are increasingly used to complement CPUs in support of emerging computing applications such as artificial intelligence, machine learning and other applications.

A CXL link may be a low-latency, high-bandwidth discrete or on-package link that supports dynamic protocol multiplexing of coherency, memory access, and input/output (I/O) protocols. Among other applications, a CXL link may enable an accelerator to access system memory as a caching agent and/or host system memory, among other examples. CXL is a multi-protocol technology designed to support a vast spectrum of accelerators. CXL provides a set of protocols that include I/O semantics similar to PCIe (CXL.io), caching protocol semantics (CXL.cache), and memory access semantics (CXL.mem) over a discrete or on-package link. Based on the particular accelerator usage model, all of the CXL protocols or only a subset of the protocols may be enabled. In some implementations, CXL may be built upon the well-established, widely adopted PCIe infrastructure (e.g., PCIe 5.0), leveraging the PCIe physical and electrical interface to provide advanced protocol in areas include I/O, memory protocol (e.g., allowing a host processor to share memory with an accelerator device), and coherency interface.

Figure 5:
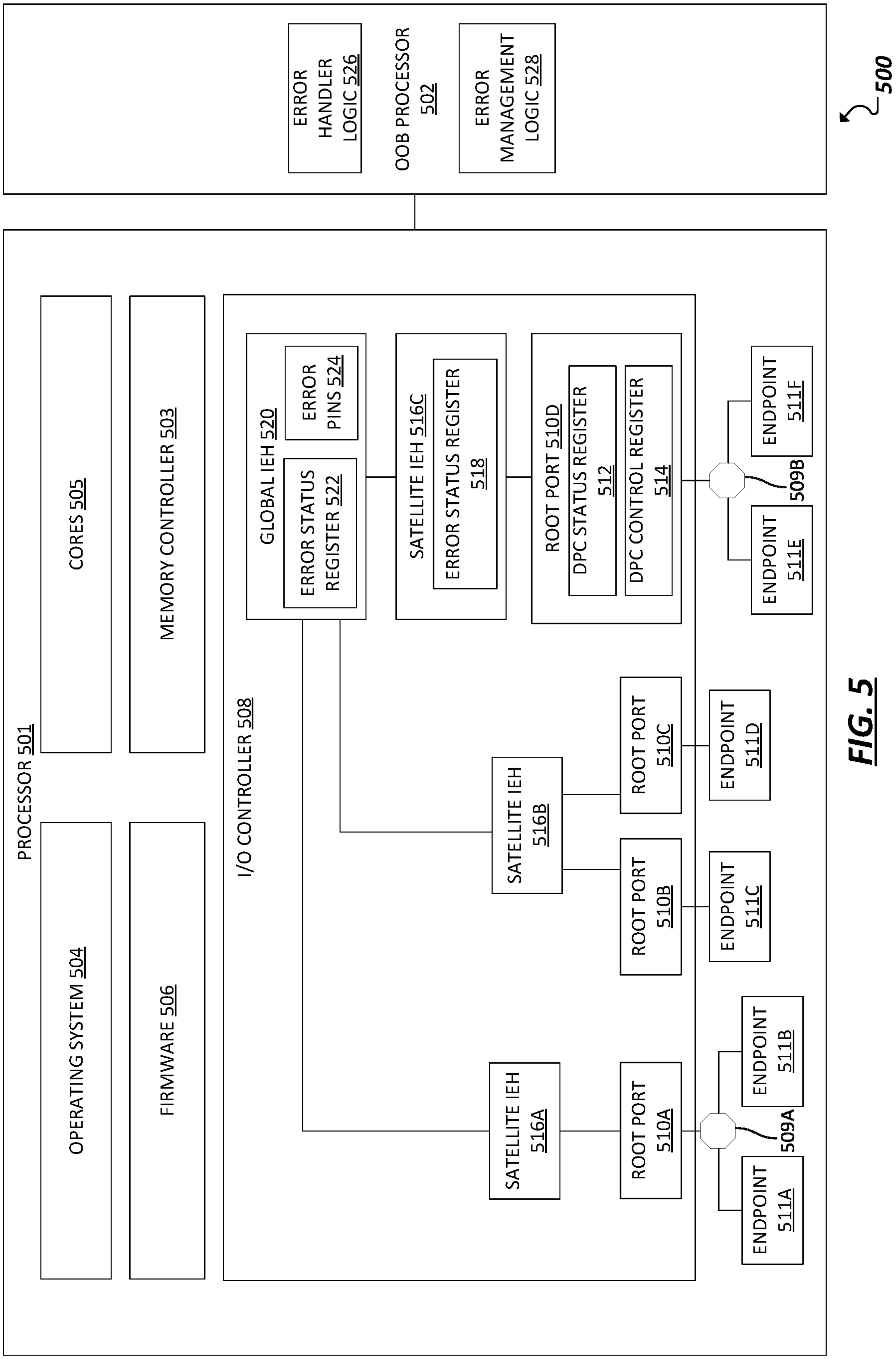
FIG. 5 illustrates an embodiment of a system for correctable error tracking and link recovery.

FIG. 5 illustrates an embodiment of a system 500 for correctable error tracking and link recovery. System 500 comprises a processor 501 coupled to an out-of-band (OOB) processor 502. In the embodiment depicted, processor 501 includes one or more processing cores 505 and a memory controller 503 to couple to system memory. The cores 505 may execute an operating system 504 and firmware 506. In some embodiments, firmware 506 may include BIOS for the system 500. The processor also includes an input/output (I/O) controller 508 comprising a plurality of root ports 510 (e.g., 510A-D) to couple to and communicate with a plurality of devices (e.g., switches 509 and endpoints 511).

A root port 510 may couple one or more I/O devices (e.g., endpoints 511) to memory controller 503, a core 505, and/or other I/O devices. In various embodiments, a root port may be located in a root complex. As used herein, upstream and downstream may refer to a position relative to the root complex, where downstream refers to a position that is farther from the root complex and upstream refers to a position that is closer to the root complex.

A root port 510 may couple to one or more I/O devices, such as a switch 509, an endpoint 511, or a bridge (not shown, a bridge may, e.g., couple to one or more I/O devices that use a signaling protocol that is different from the protocol used by the root port 510). In some embodiments, I/O controller 508 may also comprise one or more of the I/O devices (e.g., an endpoint 511 that is integrated on the same die or included in the same package as the processor 501).

In various embodiments, system 500 may utilize a PCIe architecture and/or a CXL architecture. For example, a root port 510 may be a PCIe root port (e.g., a root port that communicates in accordance with a PCIe standard) and/or a CXL root port (e.g., a root port that communicates in accordance with a CXL standard, in some embodiments a CXL root port may also communicate in accordance with a PCIe standard and thus a CXL root port could also be a PCIe root port) and an endpoint 511 may be a PCIe endpoint (e.g., an endpoint that communicates in accordance with a PCIe standard) and/or a CXL endpoint (e.g., an endpoint that communicates in accordance with a CXL standard, in some embodiments a CXL endpoint may also communicate in accordance with a PCIe standard and thus a CXL endpoint could also be a PCIe endpoint).

An I/O device (e.g., endpoint 511) may refer to any suitable device capable of transferring data to and/or receiving data from an electronic system, such as processor 501. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or other suitable device.

An I/O device may communicate with the I/O controller 508 of the processor 501 using any suitable signaling protocol, such as peripheral component interconnect PCI, PCIe, CXL, Universal Serial Bus (USB), Serial Attached SCSI (SAS), Serial ATA (SATA), Fibre Channel (FC), IEEE 802.3, IEEE 802.11, and/or other current or future signaling protocol.

Any number of the root ports 510 may each include one or more registers associated with DPC operation, such as DPC status register 512 and DPC control register 514. The DPC status register may include information associated with DPC, such as one or more of a trigger status field indicating whether the root port is currently in DPC, a trigger reason field indicating the reason that DPC was triggered (e.g., the type of error that triggered DPC or whether software triggered DPC), or other status information associated with DPC. The DPC control register 514 may include control information associated with DPC, such as one or more of a trigger enable field which defines whether DPC is enabled and under what conditions DPC is to be triggered (e.g., by the root port itself responsive to an uncorrectable error), a software trigger field which may be written to by software (e.g., software running on OOB processor 502) to trigger DPC for the root port, or other control information.

A root port 510 may be coupled to a satellite IEH 516. For example, root port 510A is coupled to satellite IEH 516A, root ports 510B and 510C are coupled to satellite IEH 516B, and root port 510D is coupled to satellite IEH 516C. The satellite IEHs 516 may all be coupled to a global IEH 520. In the depicted embodiment, a satellite IEH 516C includes an error status register (the other satellite IEHs may include a similar error status register). Errors (e.g., correctable errors and uncorrectable errors) may be reported by a root port 510 through its attached satellite IEH 516 to the global IEH 520. In some embodiments, there may be a single global IEH for the entire processor 501 (e.g., only one global IEH on a CPU package).

The global IEH may comprise an error status register 522 as well as one or more error pins 524. In some embodiments, the global IEH may comprise a first error pin 524 to signal the occurrence of a correctable error and a second error pin 524 to signal the occurrence of an uncorrectable error.

A correctable error may include an error in which the hardware (e.g., of a communication device, such as a root port 510 or an endpoint 511) can recover the data communicated without any loss of information. For example, an error that is corrected by resending of the data may be considered a correctable error. Various examples of correctable errors include bad TLPs (e.g., bad link cyclic redundancy check (LCRC) or wrong sequencer number), bad data link layer packets (DLLP), replay timer timeouts, receiver errors, etc.

An uncorrectable error may include an error that is not correctable. An uncorrectable error may impact the functionality of the interface. In some embodiments, uncorrectable errors may be classified as fatal errors (which render the associated link unreliable) and non-fatal errors (in which the link is still reliable, but the transaction including the error is not). Uncorrectable errors may include, e.g., reception of a poisoned TLP, an unsupported request, a malformed TLP error, a link training error, a DLL protocol error, a receiver overflow, etc.

The error pins 524 may be coupled to the OOB processor 502. The assertion (or toggling) of an error pin 524 may alert the OOB processor 502 that a correctable error has occurred. The OOB processor 502 may then read the error status register 522 of the global IEH 520 to obtain location information associated with the error (e.g., information partially or completely specifying the source of the error). In various embodiments, the error status register 522 of the global IEH may contain any suitable location information associated with the error, such as an identifier of the satellite IEH 516 that reported the error, an identifier of the root port 510 that reported the error, and/or an identifier of a device downstream of the root port (e.g., endpoint 511) that reported the error. In some embodiments, the OOB processor 502 may read the error status register 522 of the global IEH 520 to determine which satellite IEH 516 reported the error. The OOB processor 502 may then read the error status register 518 of the satellite IEH 516 that reported the error. In some embodiments, the value read may inform the OOB processor as to which root port and/or other device reported the error. In various embodiments, the OOB processor 502 may alternatively also read a register of a root port 510 (e.g., in order to determine which device reported the error if such information is not provided by the value in error status register 518 and the register of the root port 510 is accessible to the OOB processor 502).

The OOB processor 502 may include an error handler logic 526 that is operable to detect a signal provided by an error pin 524 (e.g., an error pin assertion), to communicate with I/O controller 508 to determine the source of the error (e.g., by reading one or more error status registers), and to increment an error counter corresponding to the source of the error. In other embodiments, error handler logic 526 may detect errors and record the errors in any suitable manner (e.g., the error handler logic 526 may be notified of errors in other ways, such as through a message sent to the OOB processor by I/O controller 508 responsive to occurrence of an error).

The OOB processor 502 may also include error management logic 528 for tracking the number of correctable errors reported by any number of error sources (e.g., root ports 510 and/or I/O devices coupled to root ports 510) as well as a correctable error rate for the error sources. The error management logic 528 may also interact with I/O controller 508 to initiate the DPC process (e.g., by writing to a DPC control register 514 of a particular root port 510) when appropriate (e.g., as described below) or other suitable process to recover a link that is exhibiting a problematic number of errors.

In various embodiments, error handler logic 526 and/or error management logic 528 may comprise software that is executed by one or more processor cores or microcontrollers of the OOB processor 502. In other embodiments, one or both of error handler logic 526 of error management logic 528 may be implemented using any other suitable hardware circuitry and/or software.

In a particular embodiment, the OOB processor 502 may be (or be part of) a BMC that performs other operations for system 500. For example, a BMC may monitors the physical state of the processor 501 or other system component using sensors to measure physical characteristics such as temperature, power-supply voltage, fan speeds, etc.

In some embodiments, all or a portion of the logic depicted as being provided on the OOB processor 502 (or the functions performed by the OOB processor) may instead be implemented by processor 501.

Figure 6:
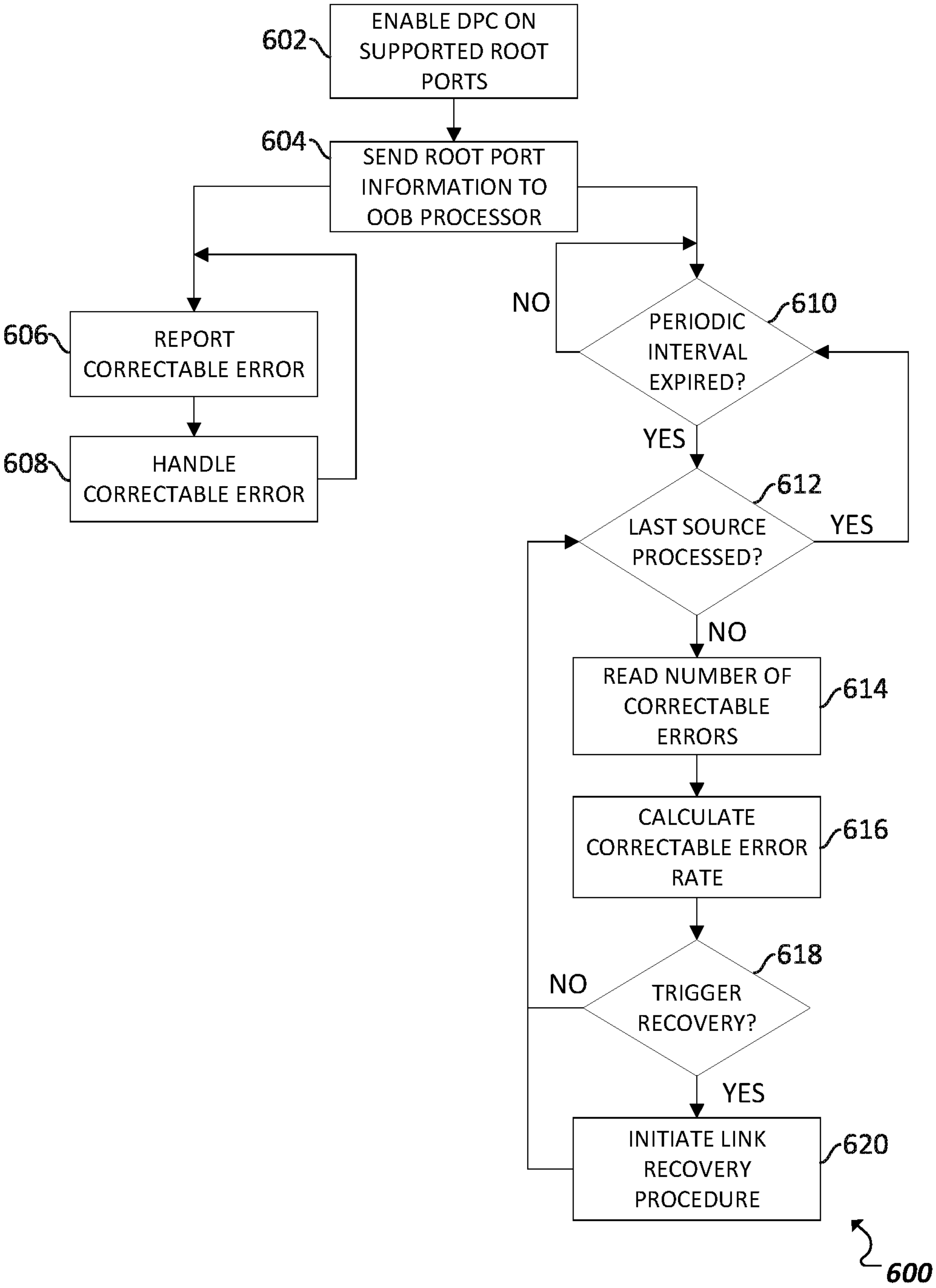
FIG. 6 illustrates an example flow for correctable error tracking and link recovery.

FIG. 6 illustrates an example flow 600 for correctable error tracking and link recovery. Flow 600 begins at 602, where DPC is enabled on root ports 510 that support DPC. Such enablement may occur at the boot time of the system 500 or at any other suitable time and may be performed by any suitable logic, such as firmware 506 (e.g., BIOS). In some embodiments, enablement of DPC on a root port 510 may include reading from a register of the root port 510 to determine whether DPC is supported and then writing to a control register (e.g., DPC control register 514) of the root port 510 to enable the DPC feature.

At 604, root port information is sent to the OOB processor 502. In some embodiments, the firmware 506 (e.g., BIOS) may initiate the sending of this root port information. Any suitable root port information may be provided to the OOB processor 502, such as identifiers of the root ports 510 of the system 500, whether triggering of DPC by software is supported by the various root ports (e.g., an indication of such support may be provided for each root port), identifiers of I/O devices coupled to the root ports, or other suitable information. In one embodiment, the root port information comprises or consists of a list of identifiers of the root ports that support triggering of DPC by software.

At 606, a correctable error is reported to the OOB processor 502 by the processor 501. In an embodiment, a correctable error may be reported by asserting or toggling an error pin, such as in the manner described above. In other embodiments not depicted herein, the reporting could be performed in another manner, such as by sending the location information associated with the error (e.g., an identifier of the root port 510 and/or I/O device reporting the error) from the processor 501 to the OOB processor 502 (e.g., in a packet) responsive to occurrence of the error.

At 608, the OOB processor 502 handles the correctable error. In various embodiments (such as those described above), the handling may include one or more reads by the OOB processor 502 to registers of the processor 501 (e.g., registers of one or more of global IEH 520, a satellite IEH 516, and/or a root port 510) to determine the source of the error. The handling may also include incrementing a counter that is tracking the number of correctable errors for the particular error source over a particular time interval. The reporting of errors at 606 and handling of errors at 608 may repeat as additional correctable errors are encountered for the various sources.

In one embodiment, the OOB processor 502 may utilize a separate counter for each root port for which correctable errors are tracked, and the correctable errors tracked for a particular root port may include all correctable errors reported by the root port (regardless of whether an error was detected by the root port itself or a downstream device). In another embodiment, the correctable errors tracked for a particular root port may only include correctable errors that were detected at the root port itself. In some embodiments, separate counters for correctable errors detected by devices downstream of the root ports (e.g., endpoints 511) may be utilized by the OOB processor 502.

As an example illustration of operations 606 and 608, during system power-on time, a BMC may be notified by error pin assertions for correctable errors corresponding to CXL/PCIe root ports (which for a particular root port may include correctable errors that occur on that root port as well as errors from devices downstream from a root port). When an error pin assertion is detected, the BMC may access IEH registers of the processor (e.g., located on an I/O controller) to determine which root port is the source of the correctable error. For every root port, the BMC may use a respective counter to track the total number of correctable errors that happened on and behind the port.

The flow 600 includes additional operations 610-620 that may be performed in conjunction with operations 606 and 608. In some embodiments, any of operations 610-620 may be performed by the OOB processor 502 in parallel with the handling of a correctable error at 608 (such that the processing performed in 610-620 does not materially interfere with the handling of errors at 608). In various embodiments, the operations of 610-620 may be performed periodically by a service handler (e.g., error management logic 528), e.g., at a regular interval (referred to herein at $T_{interval}$). In various embodiments, the service handler may process the error sources (e.g., root ports and/or devices coupled to the root ports) in order (as in the embodiment depicted) or may perform a particular operation for multiple error sources, then move to another operation for the multiple error sources, and so on (or may perform the operations in any other suitable order or manner).

At 610, if a periodic interval has not yet expired, the flow remains at 610. Once the periodic interval has expired, the flow moves to 612. At 612, the flow begins to iterate through the various error sources (e.g., root ports and/or other communication devices). Once all error sources have been processed, the flow returns to 610 to wait for the next periodic interval to expire. If all sources have not been processed, then operations 614-620 may be performed for a particular error source. In this manner, the flow operations may be performed for each error source at each interval.

At 614, a number of correctable errors for an error source is read. For example, the OOB processor 502 may read an error counter corresponding to the error source (e.g., the error counter that is incremented by the error handler logic 526 responsive to an error reported by the source). By way of nomenclature, the number of correctable errors for the Nth iteration of the service handler may be referred to as $CE\_NUM_N$. In some embodiments, the value read from the counter may be stored in a register or other storage element for future use.

At 616, a value indicative of the correctable error rate is calculated for the error source. In some embodiments, the correctable error rate is based on the number of correctable errors read at 614 ($CE\_NUM_N$) relative to the number of correctable errors read at one or more previous iterations (which values may be stored in one or more registers or other storage elements). In one example, the number of correctable errors read during the previous iteration ($CE\_NUM_{N-1}$) is subtracted from the number of correctable errors read in the current iteration ($CE\_NUM_N$) to generate the number of errors that have occurred since the previous iteration. This value is indicative of the rate of correctable errors since the error rate since the last iteration may be expressed as $(CE\_NUM_N-CE\_NUM_{N-1})/T_{interval}$, where $T_{interval}$ is the amount of time between successive iterations). In other embodiments, the value indicative of the rate may be the actual rate (e.g., the difference in errors may actually be divided by $T_{interval}$, e.g., in embodiments where $T_{interval}$ may vary from iteration to iteration or where some other motivation exists for this calculation). In other embodiments, the value indicative of the rate may be based at least in part on errors tracked over multiple intervals (e.g., the current number of errors relative to the number of errors two iterations ago, three iterations ago, etc.).

In some embodiments, a value indicative of a change in the rate of errors (e.g., the difference in an error rate calculated over one interval relative to an error rate calculated at another interval) may be calculated. For example, if an error rate spiked during one interval, but then smoothed out, the link may be stable enough that recovery is not needed.

At 618, a determination is made as to whether to trigger recovery of a link coupled to the error source. In various embodiments, the determination may be based on whether a threshold has been exceeded for the error source. For example, the value indicative of the correctable error rate may be compared against a threshold to determine whether the value is higher than the threshold. Additionally or alternatively, the number of total errors (e.g., $CE\_NUM_N$) may be compared against a threshold to determine whether the value is higher than the threshold. In further embodiments, the determination may be further based on the value indicative of a change in the rate of errors or other suitable metrics derived from the tracking of the correctable errors.

If the determination is made that link recovery is not needed (e.g., because a threshold has not been reached), then the flow may return to 612 for processing of another error source. If a determination is made that link recover should be triggered (e.g., because a threshold is exceeded), the flow moves to 620 where a link recovery procedure is initiated by the OOB processor 502. In some embodiments, the link recovery procedure may include initiation of a software triggered DPC flow by the OOB processor 502. In some embodiments, the OOB processor may trigger the DPC flow by communicating with the processor 501. After all of the error sources are processed, the OOB processor may exit the periodic service handler (e.g., implemented by error management logic 528) and the flow may return to 610 until the next interval is reached.

In various embodiments, a link recovery procedure may include any suitable actions to restore a link to a suitable state (e.g., in which the rate of correctable errors is improved as a result of the link recovery procedure). For example, the link recovery procedure may include one or more of stopping traffic over the link, retraining the link (e.g., exchanging ordered sets or other information to perform receiver detection, establish bit lock, establish symbol lock, establish block alignment, and/or to establish link parameters, such as one or more of a maximum supported data rate, lane polarity, link width, or lane-to-lane de-skew parameters), or performing link equalization.

Figure 7:
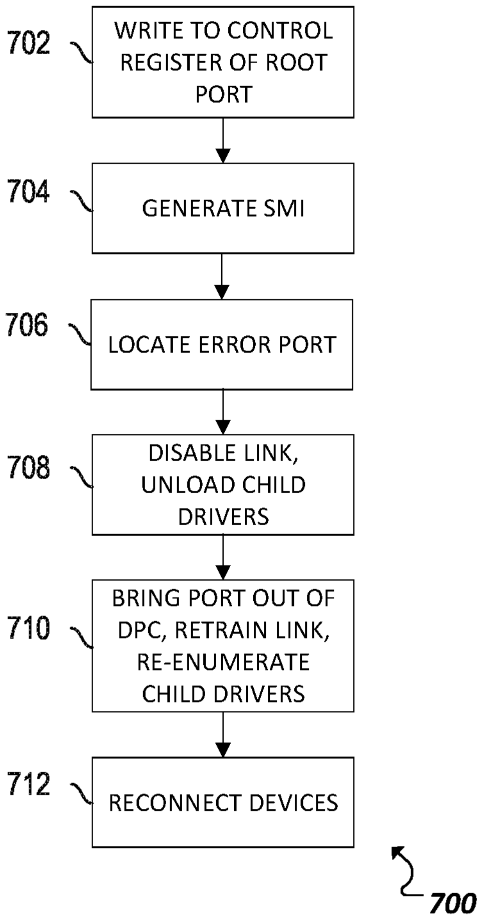
FIG. 7 illustrates an example flow for link recovery.

FIG. 7 illustrates an example flow 700 for link recovery. The specific flow depicted is based on triggering of DPC by software, but any suitable link recovery flow may be used (e.g., any of the operations described herein or other suitable operations to reestablish an operable communication link for an error source may be used during link recovery).

The flow 700 may be performed, e.g., responsive to a determination that link recovery is to be performed (e.g., because a threshold has been reached) at 618. In some embodiments, initiating link recovery at 620 of flow 600 results in the operations of flow 700 being performed.

At 702, the OOB processor 502 may send a request to processor 501 to write a value to a control register of a root port 510. For example, the OOB processor 502 may write a value to the DPC control register 514 (e.g., a value of "1" to the DPC software trigger bit) of the root port 510 that is the error source.

At 704, an interrupt is generated. In some embodiments, the interrupt may comprise a system management interrupt (SMI). The interrupt may be generated, e.g., by the root port when DPC is triggered at the root port. The interrupt may be provided to firmware 506 (e.g., BIOS). Firmware 506 may comprise an interrupt handler (e.g., an SMI handler) to process the interrupt.

At 706, an error port is located and the operating system is notified. For example, the interrupt handler (e.g., an SMI handler of a BIOS) may locate the unstable root port and signal information identifying the root port to the operating system via a system control interrupt (SCI). The unstable root port may be located in any suitable manner. For example, the OOB processor 502 may send a message to processor 501 which includes the location information (e.g., PCI bus, device and function numbers) of the unstable root port and the contents of this message may be provided, e.g., to the interrupt handler. As another example, the DPC event may update registers in the global IEH 520, satellite IEH 516, and root port 510, and the processor can then read these registers to locate the unstable root port.

At 708, the link is disabled and child drivers are unloaded. For example, the operating system 504 may disable the link downstream of the unstable root port and may unload the drivers for all devices coupled to the root port that are downstream of the root port.

At 710, the root port is brought out of DPC, the link is retrained, and child drivers are re-enumerated. For example, the operating system 504 may communicate with the root port to bring the root port out of DPC (e.g., by clearing the DPC trigger status bit of the DPC status register 512), may initiate the link retraining sequence, and may cause the drivers of the devices coupled to the root port to be enumerated again (e.g., bus numbers may be assigned to the devices). In various embodiments, the initial setup of a link may include both initialization and training of the link, whereas a link recovery procedure may omit one or more operations of the initialization of the link.

At 712, the downstream devices are reconnected to the root port and communications with these devices may resume.

Although the flow above is described with respect to an unstable root port, the flow (or other embodiments) may be adapted for other unstable ports. For example, a link recovery procedure may be performed for a link from a downstream port of a switch (e.g., 509) to an endpoint (e.g., 511). Furthermore, the flow could be performed for any suitable link of a root port, such as a link between the root port and an endpoint or a link between the root port and an upstream port of a switch.

The flows described in FIGS. 6-7 are merely representative of operations that may occur in particular embodiments. In other embodiments, additional operations may be performed. Various embodiments of the present disclosure contemplate any suitable signaling mechanisms for accomplishing the functions described herein. Some of the operations illustrated in FIGS. 6-7 may be repeated, combined, modified or omitted where appropriate. Additionally, operations may be performed in any suitable order without departing from the scope of particular embodiments.

Figure 8:
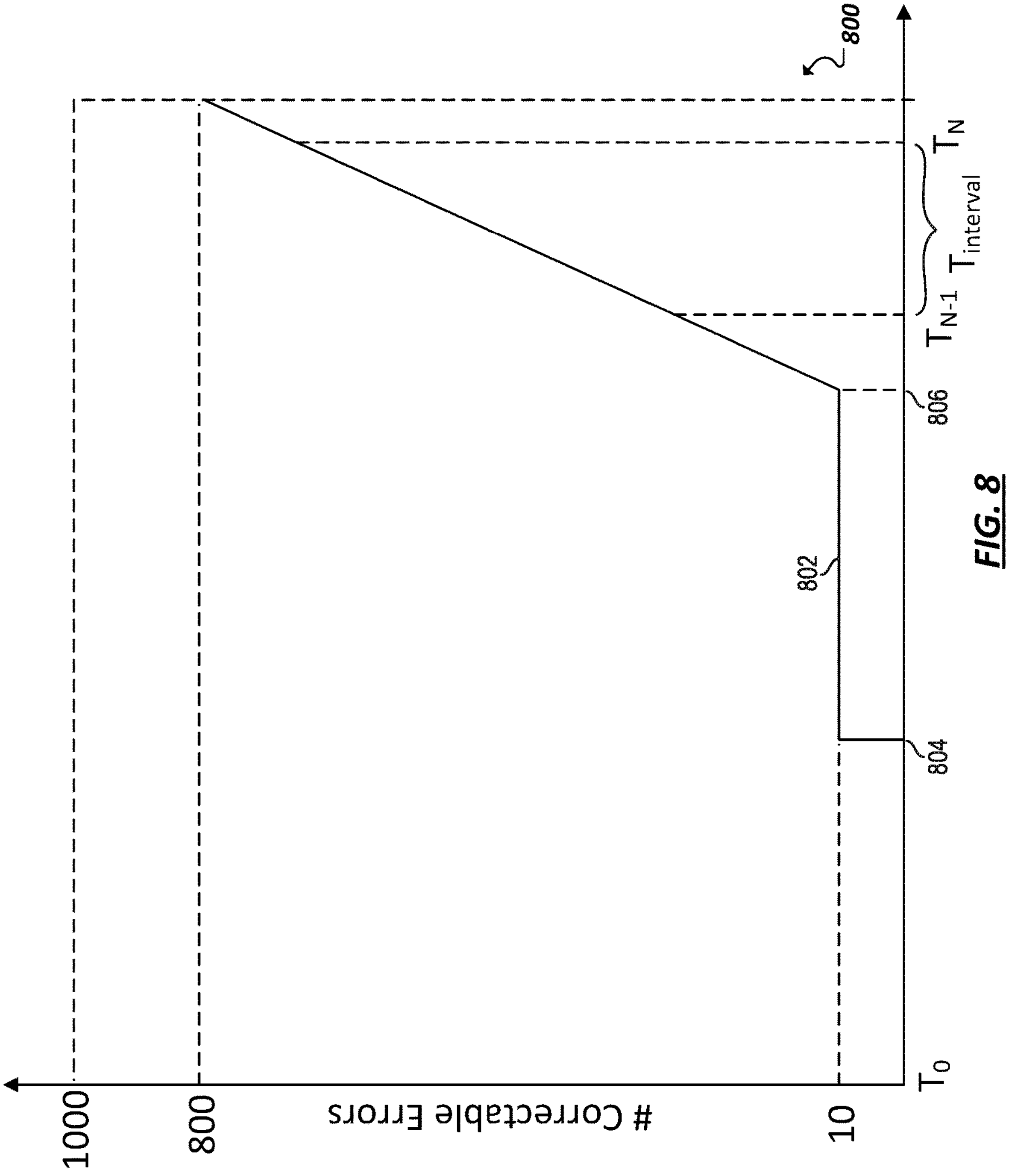
FIG. 8 illustrates an example graph of correctable errors of a link.

FIG. 8 illustrates an example graph 800 of correctable errors of a link. The x-axis of the graph is time and the y-axis of the graph is a cumulative number of correctable errors for a particular error source (e.g., root port, I/O device, combination of root port and I/O devices, etc.). The plot 802 represents the cumulative number of correctable errors as a function of time.

From time TO until time 804, no correctable errors are reported. At time 804, several correctable errors occurred, but no error threshold was reached. At time 806, the number of errors increases rapidly. Although the number of errors doesn't reach the correctable error threshold (e.g., in this embodiment, the threshold is set to 1000), the error rate for the interval ($T_{interval}$) may exceed an error rate threshold and may result in the OOB processor triggering DCP.

In various embodiments, instead of the PCIe and/or CXL protocol, any suitable protocol that supports recovery of a link based on a trigger from software may be used. Example protocols that may be adapted for use in various embodiments may include Peripheral Component Interconnect (PCI), PCIx, Universal Chiplet Interconnect Express (UCIe), Intel On-chip System Fabric (IOSF), Gen-Z, Open Coherent Accelerator Processor Interface (OpenCAPI), Serial ATA, USB, UltraPath Interconnect (UPI), and Infinity Fabric™.

Note that the apparatuses, methods, and systems described above may be implemented in any electronic device or system as aforementioned. As specific illustrations, the figures below provide exemplary systems for utilizing the concepts as described herein. For instance, components illustrated in the following examples may be implemented on separate dies or packages, and such components may be utilized to implement correctable error tracking and link recovery. As the systems below are described in more detail, a number of different interconnects are disclosed, described, and revisited from the discussion above. And as is readily apparent, the advances described above may be applied to any of those interconnects, fabrics, or architectures.

Figure 9:
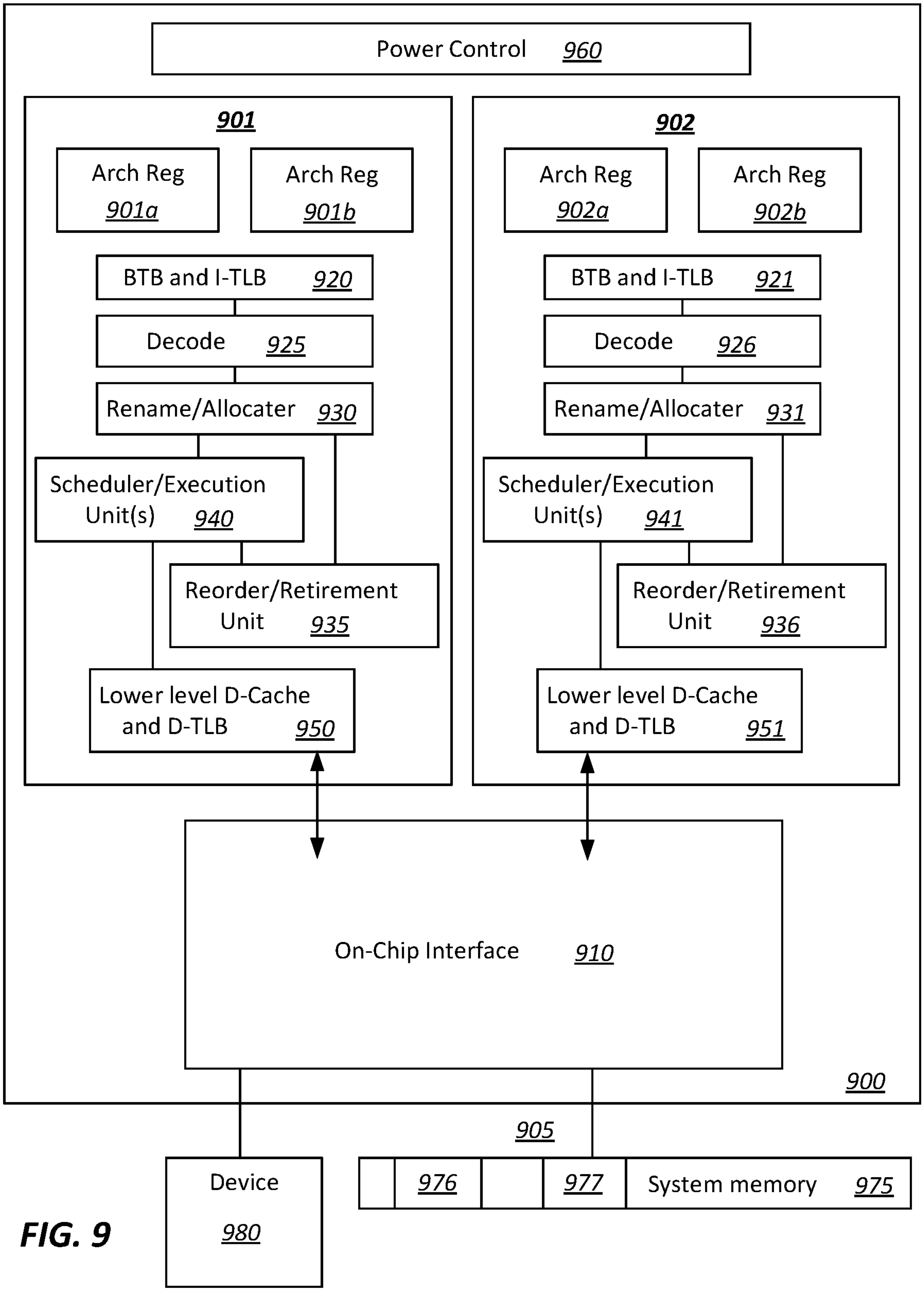
FIG. 9 illustrates an embodiment of a block diagram for a computing system including a multicore processor.

Referring to FIG. 9, an embodiment of a block diagram for a computing system including a multicore processor is depicted. Processor 900 includes any processor or processing device, such as a microprocessor, an embedded processor, a digital signal processor (DSP), a network processor, a handheld processor, an application processor, a co-processor, a system on a chip (SOC), or other device to execute code. Processor 900, in one embodiment, includes at least two cores—core 901 and 902, which may include asymmetric cores or symmetric cores (the illustrated embodiment). However, processor 900 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 900, as illustrated in FIG. 9, includes two cores—core 901 and 902. Here, core 901 and 902 are considered symmetric cores, e.g., cores with the same configurations, functional units, and/or logic. In another embodiment, core 901 includes an out-of-order processor core, while core 902 includes an in-order processor core. However, cores 901 and 902 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (e.g., asymmetric cores), some form of translation, such as a binary translation, may be utilized to schedule or execute code on one or both cores. Yet to further the discussion, the functional units illustrated in core 901 are described in further detail below, as the units in core 902 operate in a similar manner in the depicted embodiment.

Core 901, in some embodiments, may include two hardware threads, which may also be referred to as hardware thread slots. Therefore, software entities, such as an operating system, in one embodiment potentially view processor 900 as four separate processors, e.g., four logical processors or processing elements capable of executing four software threads concurrently. As alluded to above, a first thread is associated with architecture state registers 901*a*, a second thread is associated with architecture state registers 901*b*, a third thread may be associated with architecture state registers 902*a*, and a fourth thread may be associated with architecture state registers 902*b*. Here, each of the architecture state registers (901*a*, 901*b*, 902*a*, and 902*b*) may be referred to as processing elements, thread slots, or thread units, as described above. As illustrated, architecture state registers 901*a* are replicated in architecture state registers 901*b*, so individual architecture states/contexts are capable of being stored for a first logical processor (associated with 901*a*) and a second logical processor (associated with 901*b*). In core 901, other smaller resources, such as instruction pointers and renaming logic in allocator and renamer block 930 may also be replicated for threads 901*a* and 901*b*. Some resources, such as re-order buffers in reorder/retirement unit 935, ILTB 920, load/store buffers, and queues may be shared through partitioning. Other resources, such as general-purpose internal registers, page-table base register(s), low-level data-cache and data-TLB 915, execution unit(s) 940, and portions of out-of-order unit 935 are potentially fully shared.

Processor 900 often includes other resources, which may be fully shared, shared through partitioning, or dedicated by/to processing elements. In FIG. 9, an embodiment of a purely exemplary processor with illustrative logical units/resources of a processor is illustrated. Note that a processor may include, or omit, any of these functional units, as well as include any other known functional units, logic, or firmware not depicted. As illustrated, core 901 includes a simplified, representative out-of-order (OOO) processor core. But an in-order processor may be utilized in different embodiments. The OOO core includes a branch target buffer 920 to predict branches to be executed/taken and an instruction-translation buffer (I-TLB) 920 to store address translation entries for instructions.

Core 901 further includes decode module 925 coupled to a fetch unit (e.g., including 920) to decode fetched elements. Fetch logic, in one embodiment, includes individual sequencers associated with thread slots associated with architecture state registers 901*a*, 901*b*, respectively. Usually core 901 is associated with a first ISA, which defines/specifies instructions executable on processor 900. Often machine code instructions that are part of the first ISA include a portion of the instruction (referred to as an opcode), which references/specifies an instruction or operation to be performed. Decode logic 925 includes circuitry that recognizes these instructions from their opcodes and passes the decoded instructions on in the pipeline for processing as defined by the first ISA. For example, as discussed in more detail below decoders 925, in one embodiment, include logic designed or adapted to recognize specific instructions, such as transactional instruction. As a result of the recognition by decoders 925, the architecture or core 901 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 926, in one embodiment, recognize the same ISA (or a subset thereof). Alternatively, in a heterogeneous core environment, decoders 926 recognize a second ISA (either a subset of the first ISA or a distinct ISA).

In one example, allocator and renamer block 930 includes an allocator to reserve resources, such as register files to store instruction processing results. However, threads associated with 901*a* and 901*b* are potentially capable of out-of-order execution, where allocator and renamer block 930 also reserves other resources, such as reorder buffers to track instruction results. Block 930 may also include a register renamer to rename program/instruction reference registers to other registers internal to processor 900. Reorder/retirement unit 935 includes components, such as the reorder buffers mentioned above, load buffers, and store buffers, to support out-of-order execution and later in-order retirement of instructions executed out-of-order.

Scheduler and execution unit(s) block 940, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 950 are coupled to execution unit(s) 940. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 901 and 902 share access to higher-level or further-out cache, such as a second level cache associated with on-chip interface 910. Note that higher-level or further-out refers to cache levels increasing or getting further way from the execution unit(s). In one embodiment, higher-level cache is a last-level data cache—last cache in the memory hierarchy on processor 900—such as a second or third level data cache. However, higher level cache is not so limited, as it may be associated with or include an instruction cache. A trace cache—a type of instruction cache—instead may be coupled after decoder 925 to store recently decoded traces. Here, an instruction potentially refers to a macro-instruction (e.g., a general instruction recognized by the decoders), which may decode into a number of micro-instructions (micro-operations).

In the depicted configuration, processor 900 also includes on-chip interface module 910. Historically, a memory controller, which is described in more detail below, has been included in a computing system external to processor 900. In this scenario, on-chip interface 910 is to communicate with devices external to processor 900, such as system memory 975, a chipset (often including a memory controller hub to connect to memory 975 and an I/O controller hub to connect peripheral devices), a memory controller hub, a northbridge, or other integrated circuit. And in this scenario, bus 905 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 975 may be dedicated to processor 900 or shared with other devices in a system. Common examples of types of memory 975 include DRAM, SRAM, non-volatile memory (NV memory), and other known storage devices. Note that device 980 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 900. For example, in one embodiment, a memory controller hub is on the same package and/or die with processor 900. Here, a portion of the core (an on-core portion) such as on-chip interface 910 includes one or more controller(s) for interfacing with other devices such as memory 975 or a graphics device 980. The configuration including an interconnect and controllers for interfacing with such devices is often referred to as an on-core (or un-core configuration). As an example, on-chip interface 910 includes a ring interconnect for on-chip communication and a high-speed serial point-to-point link (e.g., bus 905) for off-chip communication. Yet, in the SOC environment, even more devices, such as the network interface, co-processors, memory 975, graphics device 980, and any other known computer devices/interface may be integrated on a single die or integrated circuit to provide small form factor with high functionality and low power consumption.

In one embodiment, processor 900 is capable of executing a compiler, optimization, and/or translator code 977 to compile, translate, and/or optimize application code 976 to support the apparatus and methods described herein or to interface therewith.

Figure 10:
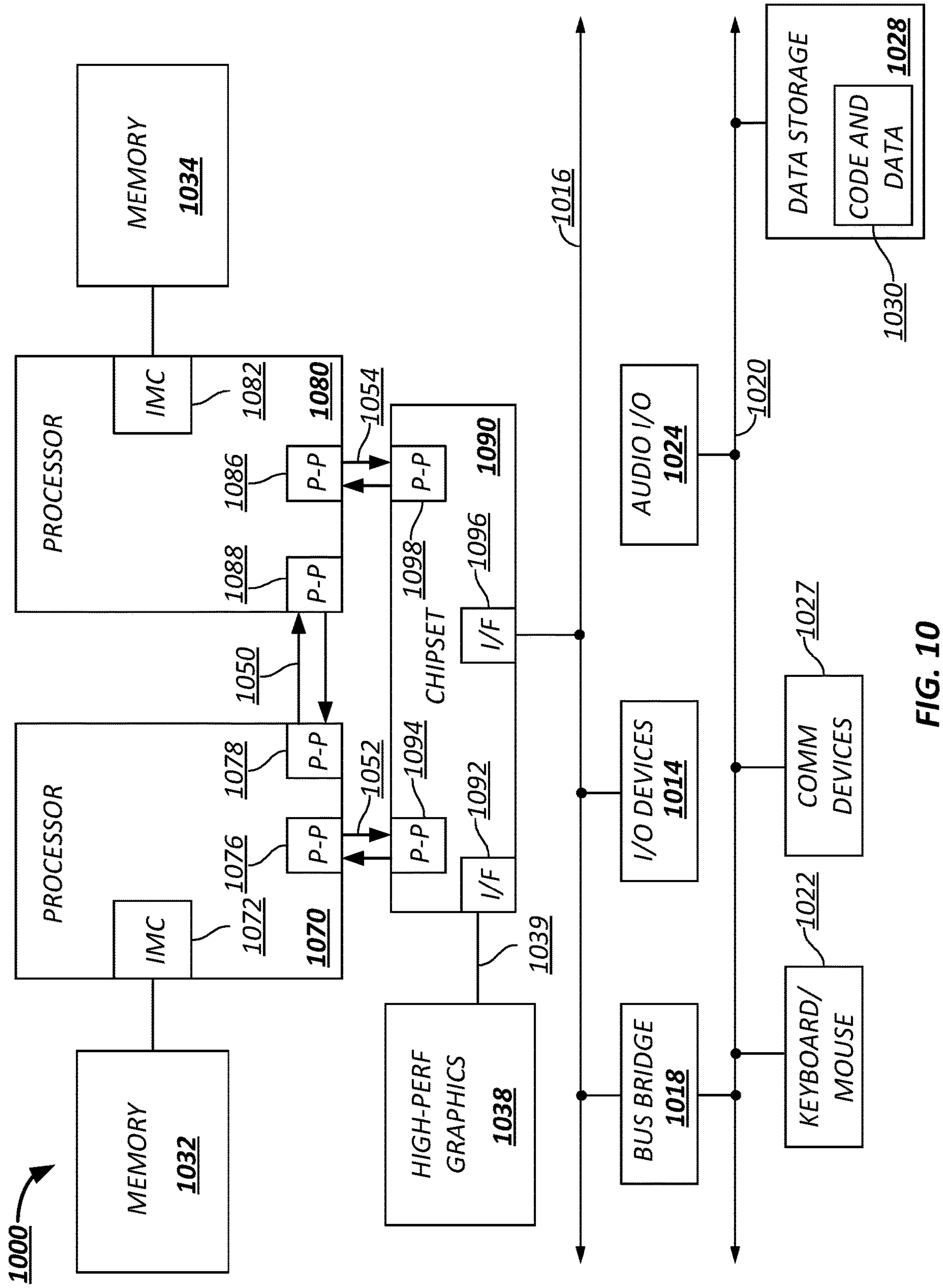
FIG. 10 illustrates another embodiment of a block diagram for a computing system.

Referring now to FIG. 10, shown is a block diagram of a second system 1000 in accordance with an embodiment of the present solutions. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of a processor. In one embodiment, 1052 and 1054 are part of a serial, point-to-point coherent (or non-coherent) interconnect fabric.

While shown with only two processors 1070, 1080, it is to be understood that the scope of the present disclosure is not so limited. In other embodiments, one or more additional processors may be present in a given processor.

Processors 1070 and 1080 are shown including integrated memory controller units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 each exchange information with a chipset 1090 via individual P-P interfaces 1052, 1054 using point to point interface circuits 1076, 1094, 1086, 1098. Chipset 1090 also exchanges information with a high-performance graphics circuit 1038 via an interface circuit 1092 along a high-performance graphics interconnect 1039.

A shared cache (not shown) may be included in either processor or outside of both processors; yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present disclosure is not so limited.

As shown in FIG. 10, various I/O devices 1014 are coupled to first bus 1016, along with a bus bridge 1018 which couples first bus 1016 to a second bus 1020. In one embodiment, second bus 1020 includes a low pin count (LPC) bus. Various devices are coupled to second bus 1020 including, for example, a keyboard and/or mouse 1022, communication devices 1027 and a storage unit 1028 such as a disk drive or other mass storage device which often includes instructions/code and data 1030, in one embodiment. Further, an audio I/O 1024 is shown coupled to second bus 1020. Note that other architectures are possible, where the included components and interconnect architectures vary. For example, instead of the point-to-point architecture of FIG. 10, a system may implement a multi-drop bus or other such architecture.

Computing systems can include various combinations of components. These components may be implemented as ICs, portions thereof, discrete electronic devices, or other modules, logic, hardware, software, firmware, or a combination thereof adapted in a computer system, or as components otherwise incorporated within a chassis of the computer system. However, it is to be understood that some of the components shown may be omitted, additional components may be present, and different arrangement of the components shown may occur in other implementations. As a result, the features and components described above may be implemented in any portion of one or more of the interconnects illustrated or described below.

A processor, in various embodiments, includes a microprocessor, multi-core processor, multithreaded processor, an ultra-low voltage processor, an embedded processor, or other known processing element. In the illustrated implementation, a processor acts as a main processing unit and central hub for communication with many of the various components of the system. As one example, a processor is implemented as a system on a chip (SoC). As a specific illustrative example, a processor includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instruction set that performs defined algorithms as set forth by the processor licensor. Here, the microarchitectural implementation may vary, but the architectural function of the processor is usually consistent. Certain details regarding the architecture and operation of processor in one implementation will be discussed further below to provide an illustrative example.

A processor, in one embodiment, communicates with a system memory, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (13P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMIMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage may also couple to processor. In various embodiments, to enable a thinner and lighter system design as well as to improve system responsiveness, this mass storage may be implemented via an SSD. However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. A flash device may be coupled to processor, e.g., via a serial peripheral interface (SPI). This flash device may provide for non-volatile storage of system software, including a basic input/output software (BIOS) as well as other firmware of the system.

In various embodiments, mass storage of the system is implemented by an SSD alone or as a disk, optical or other drive with an SSD cache. In some embodiments, the mass storage is implemented as an SSD or as an HDD along with a restore (RST) cache module. In various implementations, the HDD provides for storage of between 320 GB-4 terabytes (TB) and upward while the RST cache is implemented with an SSD having a capacity of 24 GB-256 GB. Note that such SSD cache may be configured as a single level cache (SLC) or multi-level cache (MLC) option to provide an appropriate level of responsiveness. In an SSD-only option, the module may be accommodated in various locations such as in a mSATA or NGFF slot. As an example, an SSD has a capacity ranging from 120 GB-1 TB.

Various peripheral devices may couple to processor, e.g., via a low pin count (LPC) interconnect. In the embodiment shown, various components can be coupled through an embedded controller. Such components can include a keyboard (e.g., coupled via a PS2 interface), a fan, and a thermal sensor. In some embodiments, touch pad may also couple to EC via a PS2 interface. In addition, a security processor such as a trusted platform module (TPM) in accordance with the Trusted Computing Group (TCG) TPM Specification Version 1.2, dated Oct. 2, 2003, may also couple to processor via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full-size SD-XC card reader and/or a SIM card reader for WWAN (e.g., an 8-pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

The system can communicate with external devices in a variety of manners, including wirelessly. In some instances, various wireless modules, each of which can correspond to a radio configured for a particular wireless communication protocol, are present. One manner for wireless communication in a short range such as a near field may be via a near field communication (NFC) unit which may communicate, in one embodiment with processor via an SMBus. Note that via this NFC unit, devices in close proximity to each other can communicate. For example, a user can enable system to communicate with another (e.g.,) portable device such as a smartphone of the user via adapting the two devices together in close relation and enabling transfer of information such as identification information payment information, data such as image data or so forth. Wireless power transfer may also be performed using an NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

Further, additional wireless units can include other short-range wireless engines including a WLAN unit and a Bluetooth unit. Using WLAN unit, Wi-Fi™ communications in accordance with a given Institute of Electrical and Electronics Engineers (IEEE) 802.11 standard can be realized, while via Bluetooth unit, short range communications via a Bluetooth protocol can occur. These units may communicate with processor via, e.g., a USB link or a universal asynchronous receiver transmitter (UART) link. Or these units may couple to processor via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit which in turn may couple to a subscriber identity module (SIM). In addition, to enable receipt and use of location information, a GPS module may also be present. WWAN unit and an integrated capture device such as a camera module may communicate via a given USB protocol such as a USB 2.0 or 3.0 link, or a UART or $I^2C$ protocol. Again, the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition, NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high-resolution camera, e.g., having a resolution of at least 2.0 megapixels (MP) and extending to 6.0 MP and beyond.

To provide for audio inputs and outputs, an audio processor can be implemented via a digital signal processor (DSP), which may couple to processor via a high definition audio (HDA) link. Similarly, DSP may communicate with an integrated coder/decoder (CODEC) and amplifier that in turn may couple to output speakers which may be implemented within the chassis. Similarly, amplifier and CODEC can be coupled to receive audio inputs from a microphone which in an embodiment can be implemented via dual array microphones (such as a digital microphone array) to provide for high quality audio inputs to enable voice-activated control of various operations within the system. Note also that audio outputs can be provided from amplifier/CODEC to a headphone jack.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, a processor may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

While the above solutions have been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module, engine, or logic as used herein refers to any combination of hardware (e.g., circuitry), software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, e.g., reset, while an updated value potentially includes a low logical value, e.g., set. Note that any combination of values may be utilized to represent any number of states.

The following examples pertain to embodiments in accordance with this Specification.

Example 1 includes an apparatus comprising a first processor comprising first circuitry to track correctable errors detected by a first communication device of a second processor; and second circuitry to communicate with the second processor to initiate, based on the tracked correctable errors, a link recovery procedure for the first communication device.

Example 2 includes the subject matter of Example 1, and wherein the second circuitry is to communicate with the second processor to initiate the link recovery procedure based on a correctable error rate crossing a threshold.

Example 3 includes the subject matter of any of Examples 1 and 2, and wherein the second circuitry is to communicate with the second processor to initiate the link recovery procedure based on a cumulative number of tracked correctable errors.

Example 4 includes the subject matter of any of Examples 1-3, and wherein the second circuitry is to initiate calculation of a rate of tracked correctable errors for the first communication device at a regular interval.

Example 5 includes the subject matter of any of Examples 1-4, and wherein the first communication device comprises a Peripheral Component Interconnect Express (PCIe) root port.

Example 6 includes the subject matter of any of Examples 1-5, and wherein the correctable errors detected by the first communication device comprise correctable errors occurring at the first communication device and correctable errors occurring at one or more communication devices downstream of the first communication device.

Example 7 includes the subject matter of any of Examples 1-6, and wherein the first communication device comprises an input/output device coupled downstream of a root port.

Example 8 includes the subject matter of any of Examples 1-7, and further including a baseboard management controller (BMC) comprising the first processor.

Example 9 includes the subject matter of any of Examples 1-8, and wherein the link recovery procedure includes stopping traffic downstream of the first communication device and retraining a link of the first communication device.

Example 10 includes the subject matter of any of Examples 1-9, and wherein the link recovery procedure comprises a PCIe Downstream Port Containment (DPC) process.

Example 11 includes the subject matter of any of Examples 1-10, and wherein the first processor is to read information identifying the first communication device responsive to assertion of an error pin by the second processor.

Example 12 includes the subject matter of any of Examples 1-11, and wherein the first processor is to read information identifying a second communication device responsive to a subsequent assertion of the error pin by the second processor.

Example 13 includes a method comprising tracking, by a first processor, correctable errors detected by a first communication device of a second processor; and communicating, by the first processor, with the second processor to initiate, based on the tracked correctable errors, a link recovery procedure for the first communication device.

Example 14 includes the subject matter of Example 13, and further including communicating, by the first processor, with the second processor to initiate the link recovery procedure based on a correctable error rate crossing a threshold.

Example 15 includes the subject matter of any of Examples 13 and 14, and further including, communicating, by the first processor, with the second processor to initiate the link recovery procedure based on a cumulative number of tracked correctable errors.

Example 16 includes the subject matter of any of Examples 13-15, and further including initiating calculation of a rate of tracked correctable errors for the first communication device at a regular interval.

Example 17 includes the subject matter of any of Examples 13-16, and wherein the first communication device comprises a Peripheral Component Interconnect Express (PCIe) root port and/or a Compute Express Link (CXL) root port.

Example 18 includes the subject matter of any of Examples 13-17, and wherein the correctable errors detected by the first communication device comprise correctable errors occurring at the first communication device and correctable errors occurring at one or more communication devices downstream of the first communication device.

Example 19 includes the subject matter of any of Examples 13-18, and wherein the first communication device comprises an input/output device coupled downstream of a root port.

Example 20 includes the subject matter of any of Examples 13-19, and wherein a (BMC) comprises the first processor.

Example 21 includes the subject matter of any of Examples 13-20, and wherein the link recovery procedure includes stopping traffic downstream of the first communication device and retraining a link of the first communication device.

Example 22 includes the subject matter of any of Examples 13-21, and wherein the link recovery procedure comprises a PCIe Downstream Port Containment (DPC) process.

Example 23 includes the subject matter of any of Examples 13-22, and further including reading, by the first processor, information identifying the first communication device responsive to assertion of an error pin by the second processor.

Example 24 includes the subject matter of any of Examples 13-23, and further including reading, by the first processor, information identifying a second communication device responsive to a subsequent assertion of the error pin by the second processor.

Example 25 includes at least one non-transitory machine readable storage medium having instructions stored thereon, the instructions when executed by a machine to cause the machine to track correctable errors detected by a first communication device of a processor; and communicate with the processor to initiate, based on the tracked correctable errors, a link recovery procedure for the first communication device.

Example 26 includes the subject matter of Example 25, the instructions when executed by a machine to cause the machine to communicate with the processor to initiate the link recovery procedure based on a correctable error rate crossing a threshold.

Example 27 includes the subject matter of any of Examples 25-26, the instructions when executed by a machine to cause the machine to communicate with the processor to initiate the link recovery procedure based on a cumulative number of tracked correctable errors.

Example 28 includes the subject matter of any of Examples 25-27, the instructions when executed by a machine to cause the machine to initiate calculation of a rate of tracked correctable errors for the first communication device at a regular interval.

Example 29 includes the subject matter of any of Examples 13-28, and wherein the first communication device comprises a Peripheral Component Interconnect Express (PCIe) root port.

Example 30 includes the subject matter of any of Examples 13-29, and wherein the correctable errors detected by the first communication device comprise correctable errors occurring at the first communication device and correctable errors occurring at one or more communication devices downstream of the first communication device.

Example 31 includes the subject matter of any of Examples 13-30, and wherein the first communication device comprises an input/output device coupled downstream of a root port.

Example 32 includes the subject matter of any of Examples 13-31, and wherein the machine comprises a baseboard management controller (BMC).

Example 33 includes the subject matter of any of Examples 13-32, and wherein the link recovery procedure includes stopping traffic downstream of the first communication device and retraining a link of the first communication device.

Example 34 includes the subject matter of any of Examples 13-33, and wherein the link recovery procedure comprises a PCIe Downstream Port Containment (DPC) process.

Example 35 includes the subject matter of any of Examples 25-34, the instructions when executed by a machine to cause the machine to read information identifying the first communication device responsive to assertion of an error pin by the processor.

Example 36 includes the subject matter of any of Examples 25-35, the instructions when executed by a machine to cause the machine to read information identifying a second communication device responsive to a subsequent assertion of the error pin by the processor.

Example 37 includes a system comprising first means to track correctable errors detected by a first communication device of a processor; and second means to communicate with the processor to initiate, based on the tracked correctable errors, a link recovery procedure for the first communication device.

Example 38 includes the subject matter of Example 37, and wherein the second means is to communicate with the processor to initiate the link recovery procedure based on a correctable error rate crossing a threshold.

Example 39 includes the subject matter of any of Examples 37 and 38, and wherein the second means is to communicate with the second processor to initiate the link recovery procedure based on a cumulative number of tracked correctable errors.

Example 40 includes the subject matter of any of Examples 37-39, and wherein the second means is to initiate calculation of a rate of tracked correctable errors for the first communication device at a regular interval.

Example 41 includes the subject matter of any of Examples 37-40, and wherein the first communication device comprises a Peripheral Component Interconnect Express (PCIe) root port.

Example 42 includes the subject matter of any of Examples 37-41, and wherein the correctable errors detected by the first communication device comprise correctable errors occurring at the first communication device and correctable errors occurring at one or more communication devices downstream of the first communication device.

Example 43 includes the subject matter of any of Examples 37-42, and wherein the first communication device comprises an input/output device coupled downstream of a root port.

Example 44 includes the subject matter of any of Examples 37-43, and further including a baseboard management controller (BMC) comprising the first means and second means.

Example 45 includes the subject matter of any of Examples 37-44, and wherein the link recovery procedure includes stopping traffic downstream of the first communication device and retraining a link of the first communication device.

Example 46 includes the subject matter of any of Examples 37-45, and wherein the link recovery procedure comprises a PCIe Downstream Port Containment (DPC) process.

Example 47 includes the subject matter of any of Examples 37-46, and wherein the first means is to read information identifying the first communication device responsive to assertion of an error pin by the processor.

Example 48 includes the subject matter of any of Examples 37-47, and wherein the first means is to read information identifying a second communication device responsive to a subsequent assertion of the error pin by the processor.

Example 49 includes a method comprising counting correctable errors detected by a first communication device; and initiating, based on the counted correctable errors, a link recovery procedure for the first communication device.

Example 50 includes the subject matter of Example 49, and wherein initiating the link recovery procedure is based on a correctable error rate crossing a threshold.

Example 51 includes the subject matter of any of Examples 49 and 50, and wherein the correctable errors detected by the first communication device comprise correctable errors occurring at the first communication device and correctable errors occurring at one or more communication devices downstream of the first communication device.

Example 52 includes the subject matter of any of Examples 49-51, and wherein the first communication device comprises a Peripheral Component Interconnect Express (PCIe) root port.

Example 53 includes at least one non-transitory machine readable storage medium having instructions stored thereon, the instructions when executed by a machine to cause the machine to determine a metric based on correctable errors detected by a first communication device; and initiate, based on the metric, a link recovery procedure for the first communication device.

Example 54 includes the subject matter of Example 53, and wherein the metric is a correctable error rate.

Example 55 includes the subject matter of any of Examples 53-54, and wherein the first communication device comprises a Peripheral Component Interconnect Express (PCIe) root port.

Example 56 includes the subject matter of any of Examples 53-55, wherein the first communication device comprises an input/output device coupled downstream of a Peripheral Component Interconnect Express (PCIe) root port. The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (e.g., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:

a first processor comprising:

first circuitry to track correctable errors detected by a first communication device of a second processor; and second circuitry to communicate with the second processor to initiate, based on the tracked correctable errors, a link recovery procedure for the first communication device;

wherein the first processor is to read information identifying the first communication device responsive to assertion of an error pin by the second processor, wherein the first processor is to read information identifying a second communication device responsive to a subsequent assertion of the error pin by the second processor.

2. The apparatus of claim 1, wherein the second circuitry is to communicate with the second processor to initiate the link recovery procedure based on a rate of tracked correctable errors.

3. The apparatus of claim 1, wherein the second circuitry is to communicate with the second processor to initiate the link recovery procedure based on a number of tracked correctable errors.

4. The apparatus of claim 1, wherein the second circuitry is to initiate calculation of a rate of tracked correctable errors for the first communication device at a regular interval.

5. The apparatus of claim 1, wherein the first communication device comprises a Peripheral Component Interconnect Express (PCIe) root port.

6. The apparatus of claim 1, wherein the first communication device comprises a Compute Express Link (CXL) root port.

7. The apparatus of claim 1, wherein the correctable errors detected by the first communication device comprise correctable errors occurring at the first communication device and correctable errors occurring at one or more communication devices downstream of the first communication device.

8. The apparatus of claim 1, wherein the first communication device comprises an input/output device coupled downstream of a root port.

9. The apparatus of claim 1, wherein the first processor is a baseboard management controller (BMC).

10. The apparatus of claim 1, wherein the link recovery procedure includes stopping traffic downstream of the first communication device and retraining a link of the first communication device.

11. The apparatus of claim 1, wherein the link recovery procedure comprises a PCIe Downstream Port Containment (DPC) process.

12. A method comprising:

counting correctable errors detected by a first communication device, wherein the correctable errors detected by the first communication device comprise correctable errors occurring at the first communication device and correctable errors occurring at one or more communication devices downstream of the first communication device; and initiating, based on the counted correctable errors, a link recovery procedure for the first communication device.

13. The method of claim 12, wherein initiating the link recovery procedure is based on a rate of the counted correctable errors.

14. The method of claim 12, wherein the first communication device comprises a Peripheral Component Interconnect Express (PCIe) root port.

15. At least one non-transitory machine readable storage medium having instructions stored thereon, the instructions when executed by a machine to cause the machine to:

determine a metric based on correctable errors detected by a first communication device, wherein the correctable errors detected by the first communication device comprise correctable errors occurring at the first communication device and correctable errors occurring at one or more communication devices downstream of the first communication device; and initiate, based on the metric, a link recovery procedure for the first communication device.

16. The medium of claim 15, wherein the metric is a correctable error rate.

17. The medium of claim 15, wherein the first communication device comprises a Peripheral Component Interconnect Express (PCIe) root port.

18. The medium of claim 15, wherein the first communication device comprises an input/output device coupled downstream of a Peripheral Component Interconnect Express (PCIe) root port.

19. An apparatus comprising:

a processor comprising:

a first communication device to detect correctable errors, wherein the correctable errors detected by the first communication device comprise correctable errors occurring at the first communication device and correctable errors occurring at one or more communication devices downstream of the first communication device; and circuitry to perform a link recovery procedure for the first communication device based on a metric derived from the detected correctable errors.

20. The apparatus of claim 19, further comprising a second processor to calculate the metric.

21. The apparatus of claim 19, wherein the processor comprises second circuitry to calculate the metric.

22. The apparatus of claim 19, further comprising one or more of: a battery communicatively coupled to the processor, a display communicatively coupled to the processor, or a network interface communicatively coupled to the processor.

* * * * *